United States Patent [19]

Nery

[11] Patent Number: 5,395,768

[45] Date of Patent: Mar. 7, 1995

[54] METHOD TO EVALUATE THE $R_{wb}$ PARAMETER OF THE DUAL WATER LOG INTERPRETATION MODEL

[75] Inventor: Geraldo G. Nery, Bahia, Brazil

[73] Assignee: Petróleo Brasileiro S.A. - Petrobrás, Rio de Janeiro, Brazil

[21] Appl. No.: 647,625

[22] Filed: Jan. 29, 1991

[30] Foreign Application Priority Data

May 3, 1990 [BR] Brazil .................................. 9002074

[51] Int. Cl.$^6$ ............................................. G01N 33/00
[52] U.S. Cl. ........................................ 436/25; 436/29; 436/31; 436/40
[58] Field of Search .............................. 436/25, 29–33, 436/40

[56] References Cited

U.S. PATENT DOCUMENTS 4,495,292  1/1985  Siebert et al. .......................... 436/25
4,904,603  2/1990  Jones et al. ............................ 436/25

OTHER PUBLICATIONS

C. Clavier et al.: "The Theoretical and Experimental Bases for the Dual Water Model for the Interpretation of Shaly Sands", issued in the SPE Paper 6859 (1977).

Paul E. Worthington: "The Evolution of Shaly-Sand Concepts in Reservoir Evaluation", issued in the Log Analyst, pp. 23–40, Jan.–Feb. 1985.

George V. Chilingar et al.: "Chemistry of Interstitial Solutions in Shales Versus that in Associated Sandstones", SPE Paper 2527 (1969).

*Primary Examiner*—Lyle A. Alexander
*Attorney, Agent, or Firm*—Sughrue, Mion, Zinn, Macpeak & Seas

[57] ABSTRACT

A method is described to evaluate the $R_{wb}$ parameter, which can be applied to the Dual Water log interpretation model by measuring the resistivity of initial brines and of filtrates from muds prepared with shales. The method allows a more precise evaluation of the $R_{wb}$ parameter and eventually the reservoir porosity as well as the hydrocarbon storage capacity of a given reservoir.

2 Claims, 8 Drawing Sheets

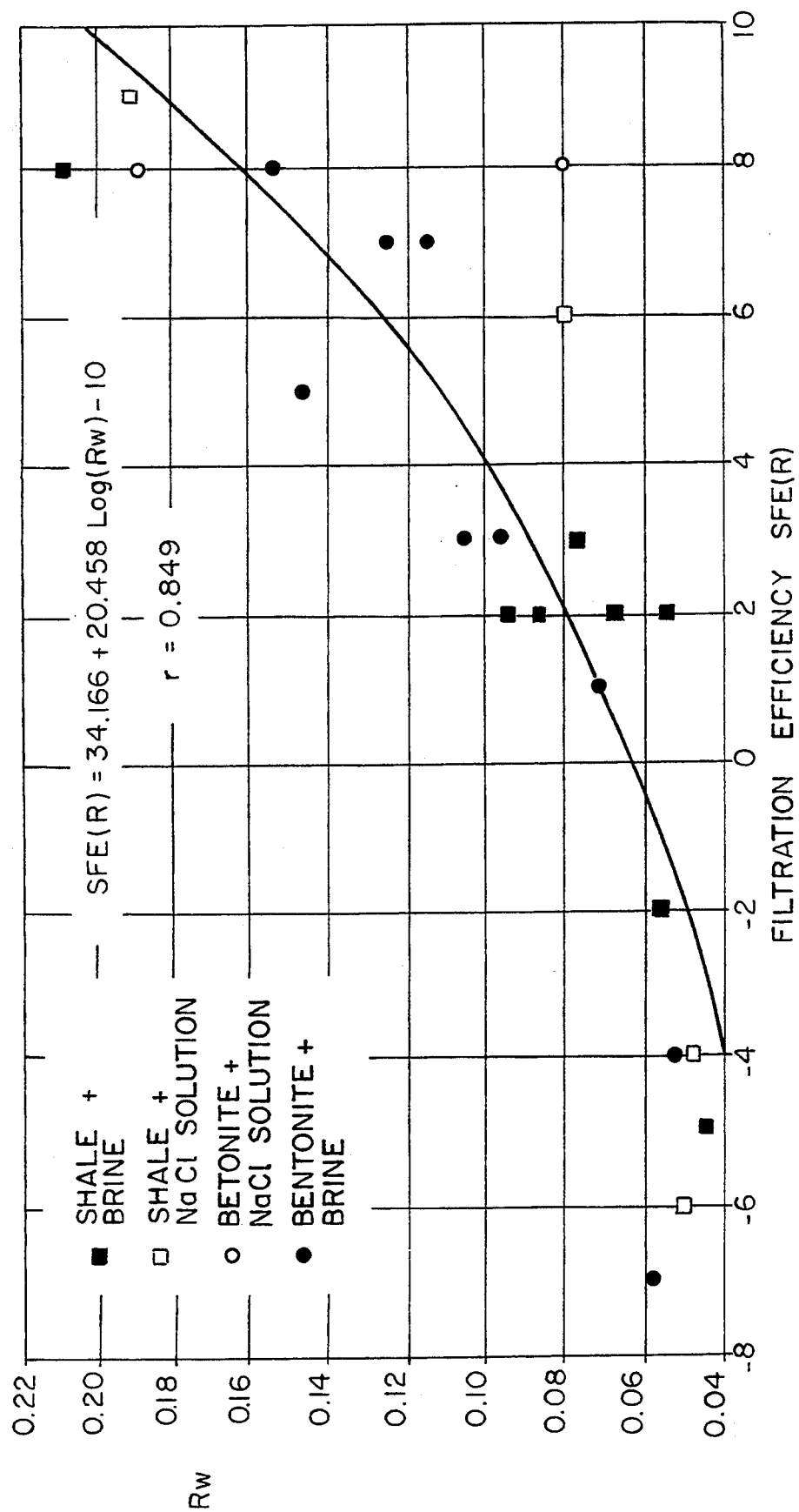

METHOD TO EVALUATE THE $R_{wb}$ PARAMETER OF THE DUAL WATER LOG INTERPRETATION MODEL

BACKGROUND OF THE INVENTION

1. Field of the Invention

The present invention relates to a method to evaluate the $R_{wb}$ parameter to be used in the interpretation of electrical, acoustic and radioactive oil well logs according to the Dual Water model suggested by C. Clavier et al. in "The Theoretical and Experimental Bases for the Dual Water Model for the Interpretation of Shaly Sands", issued in the SPE Paper 6859 (1977). More specifically, the present invention relates to a process to evaluate the $R_{wb}$ parameter - resistivity of the water adsorbed to the shales within an oil reservoir rock - through an osmotic filtration process effected on natural clays and/or crushed shales.

2. Prior Art

In the drawing of reservoir logs, constituted by plots of petrophysical measurements against depth, a correlation is sought between changes in a physical parameter and changes in depth, whereby the changes in the parameter allowing the larger or minor presence of oil in said reservoirs to be ascertained. Most of the measurements effected through well geophysical logs are related to the rock porosity, since the higher or lower porosity is directly related to the reservoir oil storage capacity.

Porosity, $\phi$, the ratio of rock void volume by total volume of the rock, is directly linked to the reservoir water saturation. On its turn, porosity is also influenced by the shaly structure ("shaliness"), or the ratio of shale volume to the pore volume, of a rock $V_{sh}$. Generally, porosity is calculated from electric, acoustic and radioactive well logs.

The parameter water saturation, $S_w$, is expressed by the ratio rock water volume to rock total volume. The amount of hydrocarbons in a reservoir can be determined by difference, if $S_w$ is known, viz, $S_{hc} = 1 - S_w$.

Besides, the concepts of porosity, $\phi$, and hydrocarbon saturation, $S_{hc}$, are directly applied to the evaluation of the hydrocarbon available volume or strategical reserves of a reservoir rock.

The water saturation, $S_w$, is also related to the resistivity of the rock interstitial water, and to the overall rock resistivity, by the equation of G.E. Archie, as described in the paper "The Electrical Resistivity Log as an Aid in Determining some Reservoir Characteristics" Trans AIME 146, 54–62 (1942):

$$S_w^n = \frac{a \cdot R_w}{\phi^m \cdot R_t}$$

where a, m and n are empirical parameters, $R_w$ is the resistivity of the rock interstitial water and $R_t$ is the overall rock resistivity, $S_w$ and $\phi$ being as pointed out before.

H. W. Patnode and M. R. J. Wyllie, in "The Presence of Conductive Solids in Reservoir Rocks as a Factor in Electric Log Interpretation", Trans. AIME 189, 47–52 (1950) recognize the influence of the shaly-structure ("shaliness") on the rock resistivity $R_t$ and the porosity.

In "Electrical Conductivities in Oil-Bearing Shaly Sands", Soc. Pet. Eng. J. 8, 107–122 (1968), M. H. Waxman and L. J. M. Smits established the laboratory basis of the Dual Water concept, for waters contained in oil reservoirs: one kind would be the free water in the pores and the other one would be adsorption-attached She claymineral particles.

This concept has been applied by Ciavier et al. to log data in the above-mentioned publication, so as to introduce the term resistivity of adsorbed water ($R_{wb}$), this parameter being derived from the characteristics of resistivity logs related to shales adjacent to the oil reservoirs being examined. However, Waxman and Smits as well as Clavier consider that the resistivity of the shale water situated upwards or downwards the sandstone, $R_{wb}$, is the same as that of the shaly fraction within the sandstone. This leads to errors in the measurement of the rock resistivity $R_t$ as well as in the porosity calculated directly from the logs. These errors are equally transferred to the water saturation calculations $S_w$, as well as to the measurement of the reservoir storage capacity or reserves. Calculations made by Waxman and Smits as well as Clavier will be right only when water concentration upwards or downwards the sandstone be exactly the same as the water of the shaly fraction within the sandstone, which is seldom the case as is also demonstrated in the present invention.

The inaccuracy in the calculations proposed by Waxman and Smits as well as by Clavier et al has been ascertained when petrographers begun the identification, within the pores of the reservoir rocks, of autigenic clays (that is, those generated after the deposition of sandstones through precipitation or alumino silicates directly from the interstitial waters). They realized that the resistivity of the shale waters upwards or downwards the sandstone, $R_{wb}$, was different from the water resistivity within the sandstone, $R_w$. As this error is conveyed to the calculation of the reservoir storage capacity, it is extremely important that true measurements of $R_{wb}$ be introduced, this being achieved through the osmotic filtration process described and claimed in the present invention.

Therefore, the above-mentioned inaccuracy in calculations comes out from three main and logical reasons:

a) the shales, interlaminated or stratigraphically positioned upwards or downwards the sandstones to be studied by means of the logs, do not necessarily show the same mineralogical characteristics as the autigenic or alogenic clays which are present in the pores of shaly sand rocks, chiefly in the case of the autigenic clays;

b) the shale calculated porosities are inferred from the properties of pure sandstones; therefore, these are apparent and not realistic porosities; and, c) also, the shales petrophysical parameters, a, m and n are not identical to those of the sandstones.

Therefore, the chief problem in precisely measuring the resistivity of shaly sedimentary rocks comes chiefly from the presence of clayminerals within the pores of the reservoir rocks, where these clayminerals behave as semi-permeable or selfflitrating membranes. This behavior has first been mentioned by L. U. De Sitter in "Diagenesis of Oil Field Brines" Bull AAPG, 31 (11), p. 2030–2040 (1947) and later by F. Bernstein in "Distribution of Water and Electrolytes between Homoionic Clays and Saturating NaCl Solutions" - Proc. 8th. National Clay Conference, Pergamon Press, p. 122–149 (1960). This physicochemical property of shaly membranes is due to a cationic adsorption phenomenon present in the huge clay mineral contact surfaces in order to overcome the negative charge sites, formed by isomorphic substitutions or hydrogen dissociation from structural hydroxyls or even mechanical failure of claymineral particles. This adsorption gives rise to zones of distinct ionic concentrations adjacent to the claymineral surfaces, while a neutral salinity zone occurs in the more central sites of the porous spaces. Such adsorptive zones are called double electric Zayers. The present invention states that low pressure osmotic filtrations can equally retain or even free salts.

Experimental simulations of incipient, low pressure compactions on artificial shaly muds, suggest that the initial diagenetic processes following sedimentation suffered by sedimentary rocks are of osmotic nature. They have origin different salt concentrations and/or vapor pressure experienced by the solutions within their pores, which entrain variations in the salinity of their filtrates or effluents, this variation being nearly 10%.

Therefore, osmosis is a diagenetic process which is active during the initial compaction stages of shaly muds. The observed variations in the salinities of their filtrates are such that highly concentrated muds show high efficiency in salt retention or filtration, while the more diluted ones free or squeeze out salts. The process of salt retention or filtration in these diagenetic stages is called here osmotic filtration or at low pressure.

There is a point of osmotic stability between the salinities of the mud interstitial solutions and of their effluentes. Below that point the mud retains salt while its effluent becomes more diluted, or sweeter, than the original solution employed to prepare the mud. Above the stability point the mud frees salts and its effluent turns more concentrated, or salty. The stability, or equilibrium point, signals the actual concentration of the water adsorbed to the claymineral particles present in the mud, which can be converted to resistivity, $R_{wb}$, and further used in advanced quantitative models of electric, acoustic and radioactive logs, analogous to that proposed by Claylet et al, mentioned before, as well as other similar models.

A main aspect to be considered in these studies is the concept of the clayminerals double electric layer. This double layer is formed by the excess of outward negative charges in the claymineral, the neutralization of which requires positive counter ions, this phenomenon being called Cation Exchange Capacity - CEC. On their turn, counter ions are subjected to two opposite force systems: the electrostatic force which attracts them towards the clayminerals outward contact surface, while a chemical diffusion potential leads them to the inner part of the pores. While in the anhydrous state the counter ions are attached to the clayminerals surface, in aqueous solutions the attractive forces are drastically reduced as a function of the high water dielectric constant, giving rise to an ordered diffusion in the ambient solution, creating zones of ionic concentrations or electric, distinct charges, called double electric layers.

In the diagenetic process which is at the origin of the sedimentary rocks post-deposition modifications, the sediments compaction reaches rather effective high pressures; there is then an overlapping of two electric layers, from neighboring claymineral particles, the consequence being the volumetric loss of ions (Donnan effect), and electric imbalance. On the opposite side of the ionic flow there is an electrostatic cation or salt retention. De Sitter observed this semi-permeability in the above-cited paper. As for the minimum pressure for the shales or clayminerals to behave electrostatically as a semi-permeable membrane, up to now, there is no agreement among various authors, who point out values between 100 and 700 kg/cm$^2$.

Semi-permeable membranes allow the establishment of an osmotic flow, the consequence of which is the balance of concentrations or pressures on both sides of a membrane. A typical example is the deposition of a shaly mud, which will have initially the same concentration in the solution of its micro and macropores, in spite of different vapor pressures. The lower vapor pressure in the micropores is due to the high cations and water molecules adsorption to the claymineral walls. Through the small separation existant between the macro and micropore, which, according to F. Bernstein in the above-mentioned paper behaves as a semi-permeable membrane, an osmotic flow is established from the macropore to the micropore, the flow ceasing when vapor pressures at both sides of the membrane are balanced. The direction of the osmotic flow causes a higher salt concentration within the macropore and, in case the mud is submitted to pressure or otherwise compressed, the macropore fluids, which are more easily freed, produce effluents which are more concentrated than the original solution. In other situations, the micropore solution is more diluted than that of the macropores, osmosis is established from the micro to the macropore, and the macropore solution turns more diluted. In case this mud is compressed, there are obtained more diluted effluents than the original waters used in the mud preparation. In this latter situation the osmosis effect corresponds to an effective salt retention, very similar to the filtration which would occur in case of an overlapping of electric double layers, or electrostatic filtration.

Therefore, osmotic processes are of utmost importance to determine the salinity of mud effluents or filtrates submitted to pressures such as those occurring in natural diagenetic processes. On the other hand, salinity is linked to the rock resistivity through the equation below:

$$F = \frac{R_o}{R_w} = \frac{C_w}{C_o}$$

where F is the formation factor;
$R_o$ is the resistivity of a reservoir rock completely saturated (100% saturation) by an aqueous electrolyte of resistivity $R_w$;
$C_o$ and $C_w$ are the corresponding conductivities.

According to this equation, for a given sample, a plot of $C_o$ vs. $C_w$ should be a straight line of slope 1/F provided that be satisfied the following conditions: a shale-free reservoir completely saturated by water of resistivity $R_w$. Under these conditions, the formation factor (F) is a rock parameter describing the geometry of its pores. F is independent of $C_w$ such that $C_w/C_o$ vs. $C_w$ for a given sample shall equally give a straight line in a linear plot.

However, for shaly sands and a given value for $C_w$, the $C_w/C_o$ ratio is reduced, this being attributed to the influence of the rock shale content on $C_o$. As $c_w$ is reduced, $C_o$ is more rapidly reduced, or, for small values of $C_w$, there is an extra conductivity, attributed to the shale content. Thus, the electric display of the effects coming from the presence of clay(shale) in the rocks has been described in terms of an "excess conductivity" represented by a factor X in the equation below:

$$C_o = \frac{C_w}{F} + X$$

In log interpretation studies, another important parameter related to the porosity is the water saturation - $S_w$ - which is a function of the porosity and the overall rock resistivity, as well as of the water resistivity, that is, the salinity. G. V. Chilingarian, in "Chemistry of Interstitial Solutions in Shales versus that in Associated Sandstones", SPE paper no. 2527 (1969), provides a thorough discussion on this matter.

The above-mentioned paper by Clavier et al. contains still other important considerations on the correlations existing among porosity-conductivity-water saturation in shaly sands.

The state-of-the-art literature permits to determine a reservoir porosity with the aid of the set of sonic, neutronic and density logs. As there is a direct relationship between porosity and resistivity, more precise resistivity measurements will constitute a precious tool in determining a reservoir porosity, and eventually to better quantify the reservoir hydrocarbon content.

SUMMARY OF THE INVENTION

Therefore, the method described and claimed in the present invention represents a contribution to the development of simpler and more precise procedures to evaluate the $R_{wb}$ parameter, which means the resistivity of shale-bound waters. This parameter can be determined through osmotic filtration and used in the Dual Water log interpretation model and the like. On its turn, the $R_{wb}$ value is used in the determination of the $S_w$ parameter - water saturation - employed in the evaluation of the reservoir rock hydrocarbon content.

1. General Statement of the Invention

Therefore, the objective of the present invention is to, determine the $R_{wb}$ parameter which is a primary need in the quantification of the reservoir rock hydrocarbon content, this being obtained from mud effluent salinity data, muds having been submitted to pressures of the order of those occurring in the beginning of sedimentary rock compaction.

DESCRIPTION OF THE PREFERRED EMBODIMENT

In order to comply with the aforementioned objective, the method of the present invention, devised to determine the salinity of sendimentary rock interstitial waters, comprises the following steps:

A) Solids Preparation a) effect the solids mineralogical identification by means of X-Rays diffratometry;
b) mill the shale cores identified in a), retaining the fraction passing through a 200 mesh Tyler screen;
c) measure the Cation Exchange Capacity (CEC) of step b) solids;

B) Solutions Preparation a) prepare brines with varying contents of potassium, magnesium, sodium and calcium ions;
b) measure the resistivity $R_w$ of the original brines prepared in a);

C) Muds Preparation a) prepare muds of 20% solids and 80% liquids concentration, the mud density being 1.4 g/cm³, the muds being left at rest at least for 72 hours after preparation;

D) Filtration-Measurement a) Submit the muds prepared in C) to a pressure of 100 psig, (7 kg/cm²), collect the various filtrates and measure their resistivities $R_{mf}$ in a precision resistivity meter;

E) Determination of the Salt Filtration Efficiency (SFE)

a) Determine the SFE (R) of each mud as a function of resistivity data using the formula:

$$SFE(R) = \frac{R_w - R_{mf}}{R_w} \times 100$$

F) Drawing of the Plots a) draw a logarithmic plot of the resistivity $R_w$ of the original brines (item B,b) vs. the filtrates resistivities $R_{mf}$ (item d), which results in a straight line of correlation coefficient near 1, where the situation of osmotic balance is given by $R_w = R_{mf}$.
b) SFE(R) vs. $R_w$ Draw a plot of $R_w$ values determined in B)b) vs. SFE(R) values determined in E)a). When SFE(R) is zero, there is osmotic balance, that is, $R_{mf} = R_w = R_{wb}$, the artificial mud having at this point the same salt concentration in the interstitial water of its macro and micropores.

X-Rays diffratometry is intended for the mineralogical indentification of the solids employed in the mud preparation. Analysis is effected on air-dried, glycolated solids, heated at 490° C. As for the shales, the proposed method has been applied on bentonite samples, a mineralogically pure material, used as a gauge and a control. Besides the salt solutions containing potassium, magnesium, sodium and calcium, a solution of pure sodium chloride is also employed.

The shale samples are crushed in a ceramic mill. The mesh size (200 mesh, 0.074 mm) is adequate to collect solids of a smaller size which contain the siltic fraction thus simulating an actual process of sedimentary deposition.

The shales Cation Exchange Capacity - CEC - was determined using the ammonium acetate method, according to D. T. Davidson and J. Sheeler, as described in "Cation Exchange Capacity of Loess and its Relation to Engineering Properties", ASTM Special Publication 142, 10–28, 1952. For the shales, this value amounted to 44 meq/100 g of dry matter, while for pure bentonite it reached 97 meq/100 g.

Solutions of variable concentrations of the main salts present in seawater are prepared from successive evaporations of seawater, the initial composition being: Na, 11,000 mg/l, K, 426 mg/l, Ca, 419 mg/l, and Mg, 1440 mg/l. For more diluted solutions, an extra volume of distilled water is added.

The ratio 80% solids - 20% liquids is that one which better reproduces the initial porosity of the actual sediments, comprised between 50 and 90%.

After being prepared, muds are homogenized, through agitation at 18,000 rpm and left still for at least 72 hours, in order to attain the osmotic balance among the involved components.

Resistivity measurements were effected by means of a four element resistivity meter of absolute nominal accuracy equal to 0.001 Ohm.m, and relative precision 0.5 to 2.0% in the chosen interval.

As a control, besides the resistivity measurements, the ionic concentrations in the initial salt solutions and their filtrates is ascertained by means of atomic absorption spectrometry.

In order to turn resistivity data into NaCl equivalent salinity, the R. M. Bateman and C. E. Konen algorithm was used, according to the issue of The Log Analyst 18, (5), 3-11 (1977): "The Log Analyst and the Programmable Pocket Calculator: Determination of $R_w$ from the SP".

The present invention is now illustrated by the following Examples, which should not be construed as a limitation thereof.

EXAMPLES 1 to 23

The following Examples were obtained on shale cores collected in a development well in the Aracás Field, at the state of Bahia, Brazil. Macroscopically, the shale is greyish green, slightly calciferous, brittle, semihard to hard. Mineralogically, it is comprised of quartz (20%), plagioclasium (20%), calcite (10%), dolomite (10%) and clayminerals (30%), besides traces of potassium reidspates. In percent, the clayminerals are represented by interstrata of illite-smectite (55%), illite and chlorite (15%).

Stratigraphically, cores belong to the Gomo Member of the Candeias Formation, Reconcavo Basin, Bahia, Brazil.

In the following Examples, the authors have established simulations of incipient compactions, under 100 psig (7 kg/cm$^2$) pressure, summing 23 artificial mud samples, in order to obtain and measure their effluents (filtrates) salinity. The muds were prepared from 20% solid matter (either natural bentonite or shale fragments, crushed and sieved through a 200 mesh sieve) and 80% liquids (either NaCl solution or brines from seawater). Salt contents, measurements and analyses results are as set forth before.

Resistivity measurements results for Examples 1 to 23 are set forth in Table I. Muds numbered 8 to 23 showed a constant reduction in the resistivity of their filtrates ($R_{mf}$), as related to the original waters used to prepare them ($R_w$). In other words, these muds squeezed out salts to their respective filtrates. On the other hand, muds numbered 1 to 7 (except/on made to number 5) show an opposite behavior, that is, their filtrates show higher resistivities ($R_{mf}$) than their original water counterparts ($R_w$), thus indicating an effective salt retention. Table I shows equally that, for this experiment, the osmotic balance resistivity ($R_w = R_{mf}$) must be situated in between that of samples 7 and 8, that is $0.058 < R_w < 0.065$ Ohm.m at 24° C.

$$R_w = 1.299 \, R_{mf}^{1.095}$$

Figure 2:
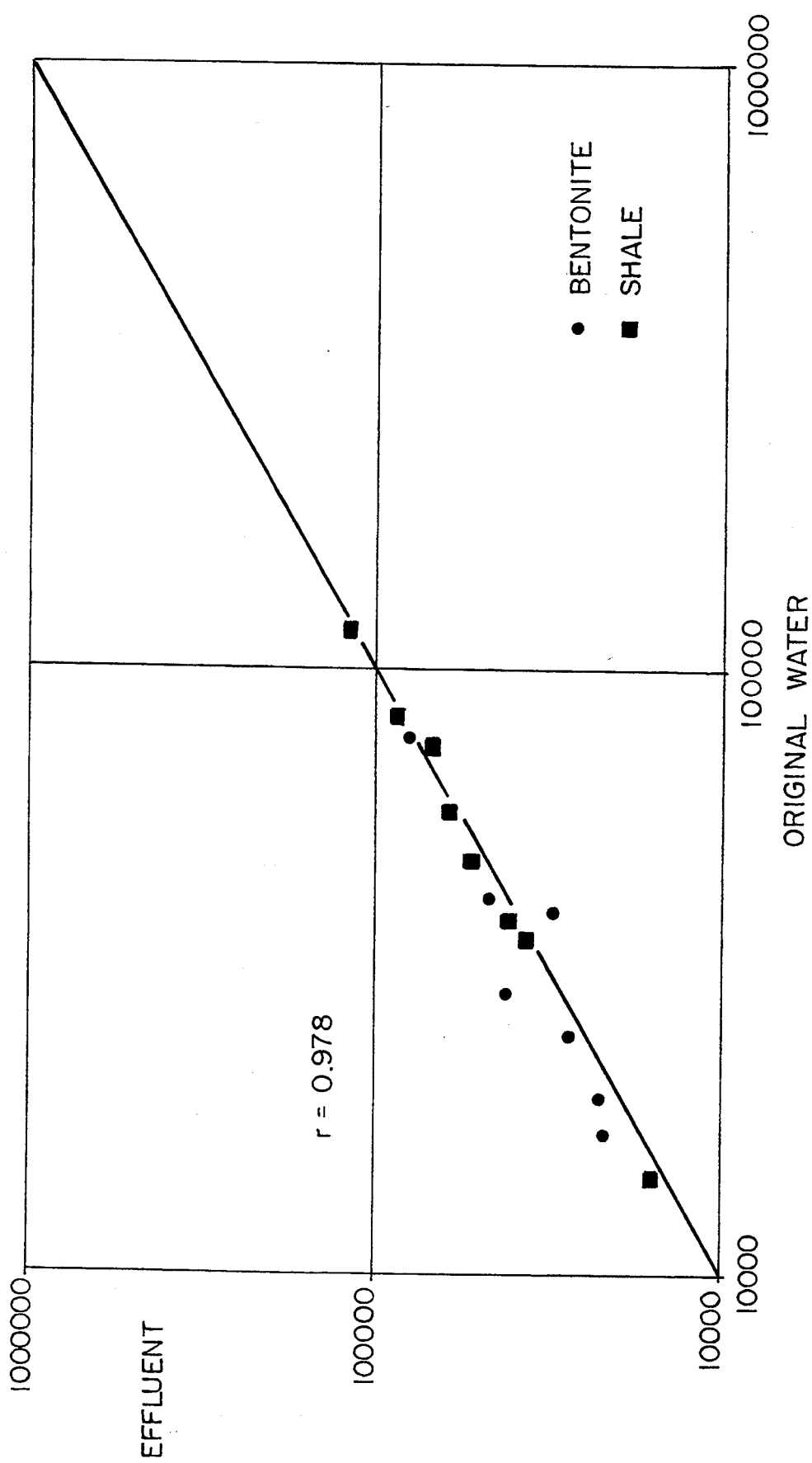
Figure 3:
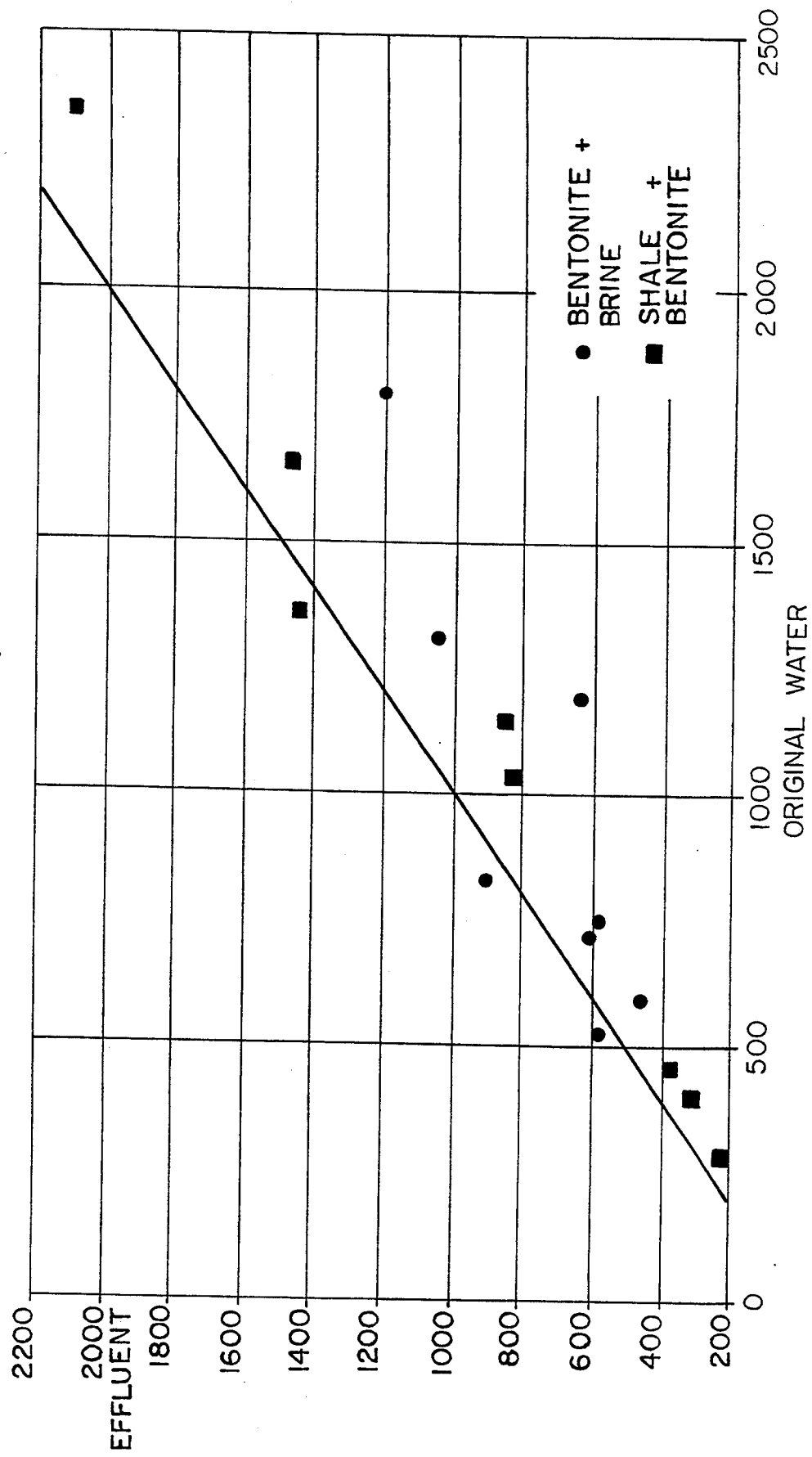
Figure 4:
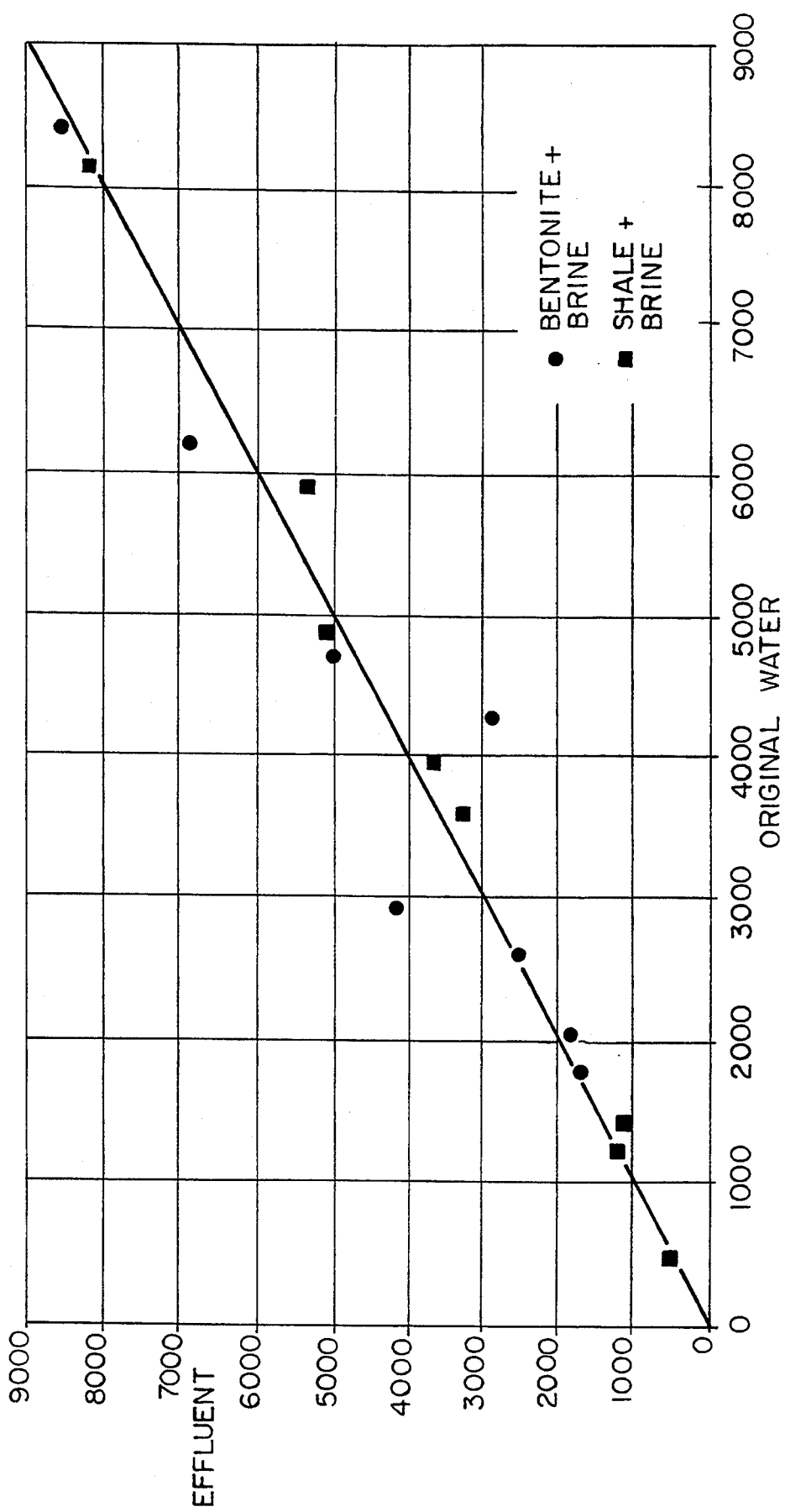
Figure 5:
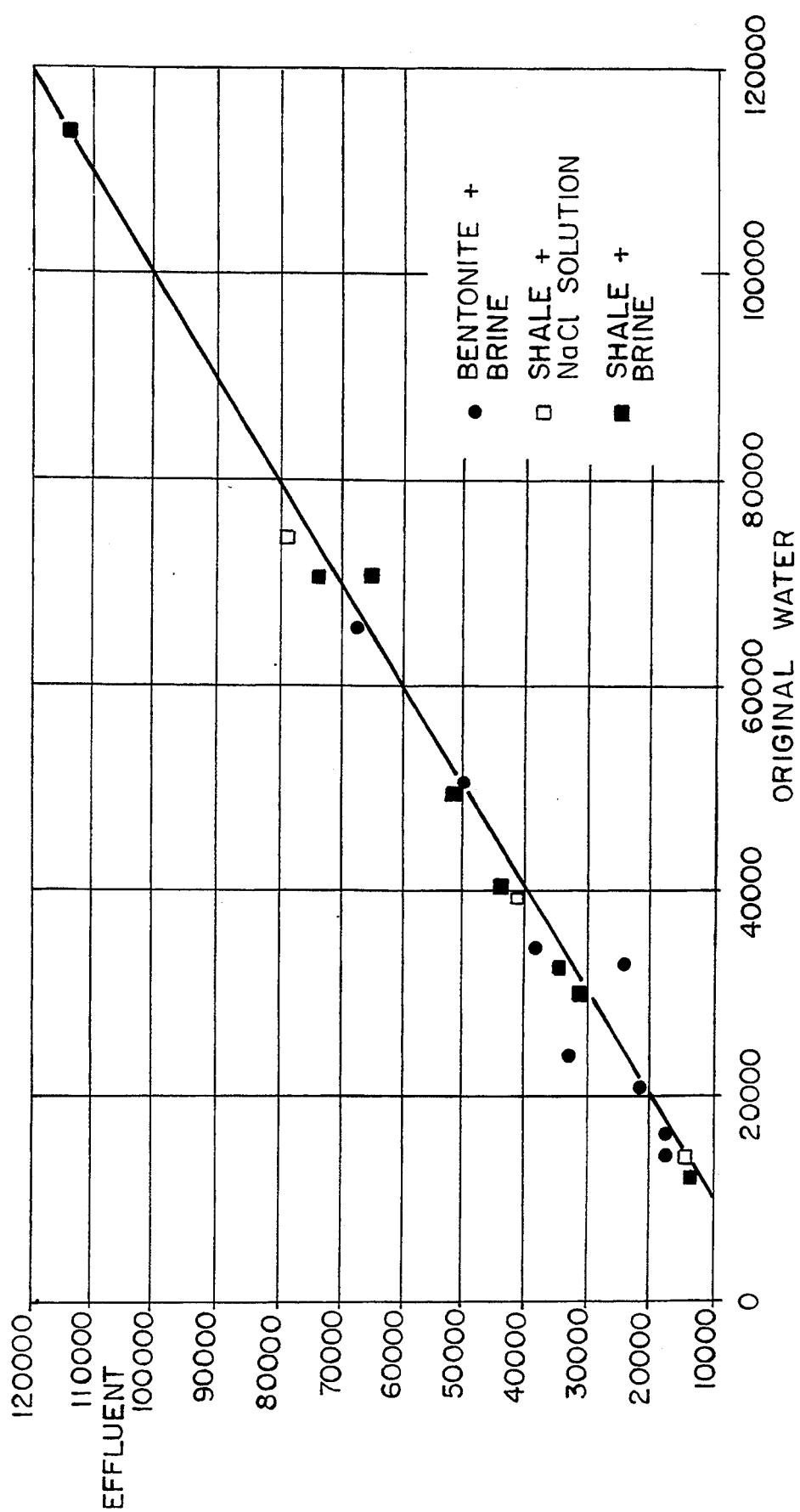
Figure 6:
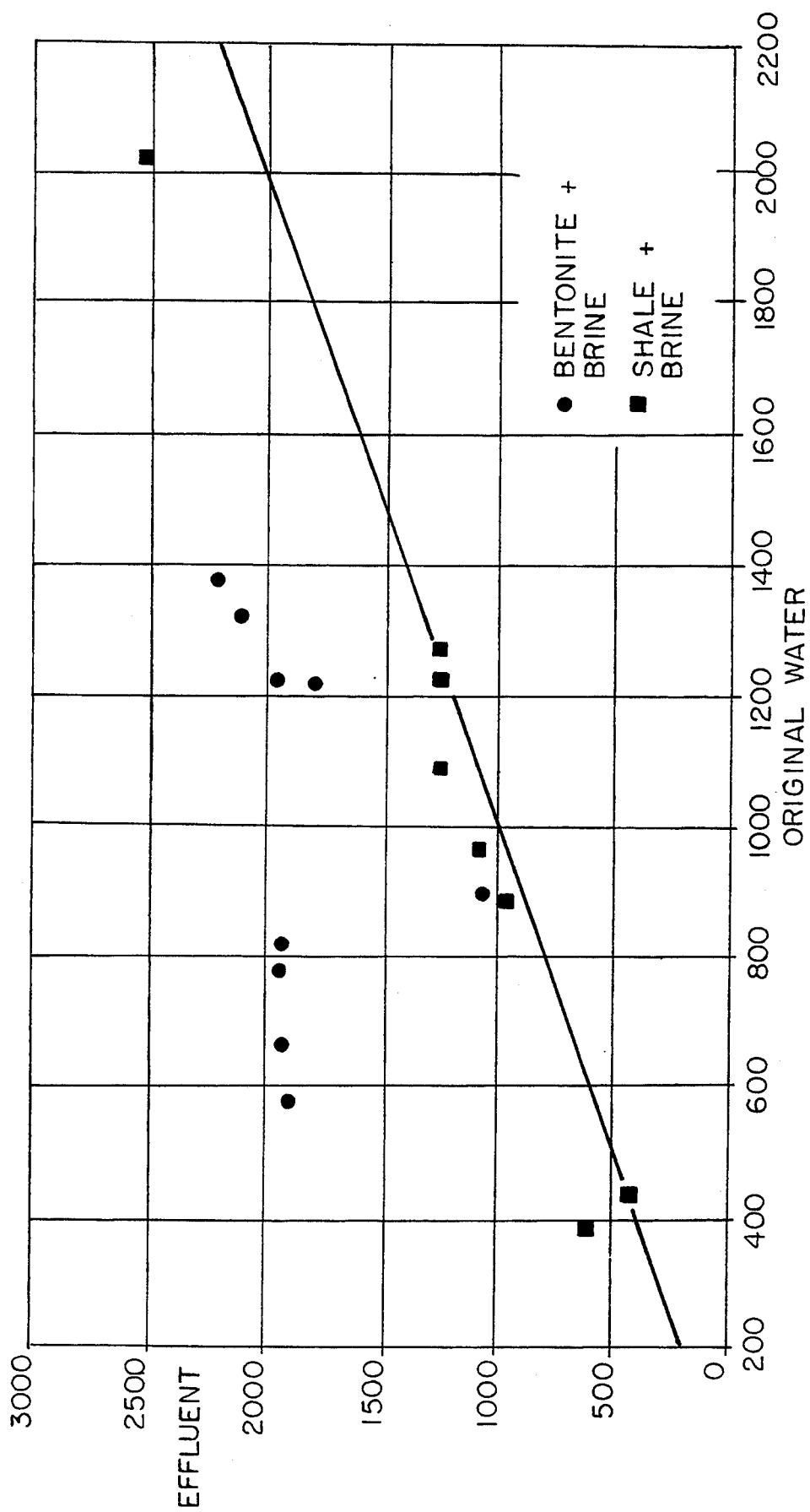

FIG. 2 illustrates Table II and contains results of overall atomic absorption analyses for elements K, Mg, Ns and Ca found in the samples. The high correlation coefficient, 0.978, means the high level of consistency between relative resistivities and salinities restricted to the referred to four elements.

Figure 7:
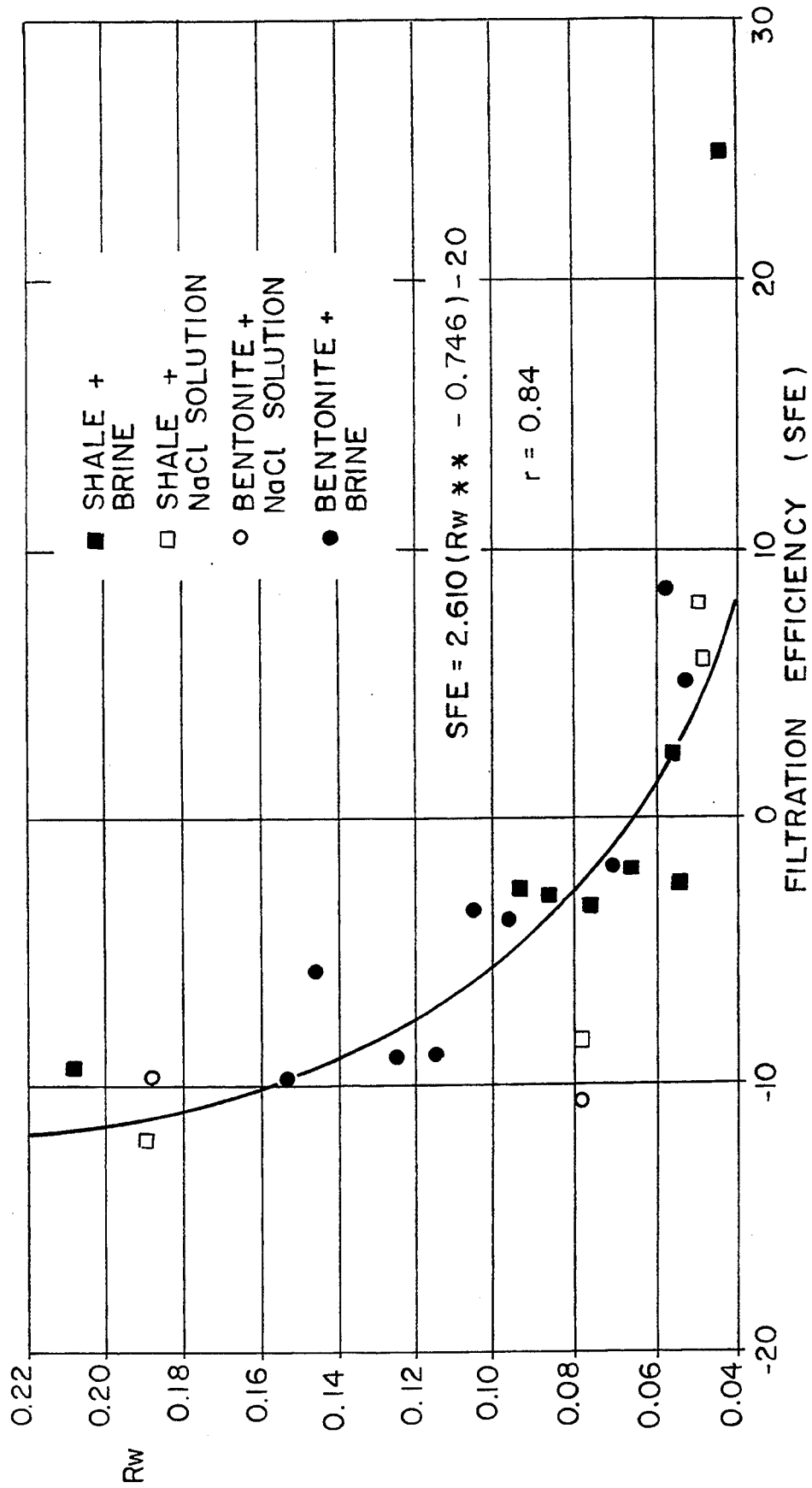

FIGS. 3 to 6, illustrate results of individual atomic absorption for sodium, potassium, calcium and magnesium. Bateman and Konen equation, relative to $R_w$ (resistivity of the FIGS. 7 and 8 represent data from Tables I and II. FIG. 7 shows the Salt Filtration Efficiency (SFE) derived from the Bateman and Konen equation, relative to $R_w$ (resistivity of the original water used to prepare the muds). The correlation coefficient is 0.840 and the equation answer is:

$$SFE = 2.610 \, R_w^{-0.746} - 20$$

When SFE is zero (osmotic balance), the foregoing equation will furnish $R_w \cong 0.065$ Ohm.m at 24° C., which corresponds to a SAL(BK) of 116,500 ppm, or 180,000 mg/l NaCl.

FIG. 8 links $R_w$ and SFE(R), the filtration efficiency calculated from the measured resistivities, the correlation coefficient being 0.849 The equation is:

$$SFE(R) = 34.166 + 20.458 \log R_w - 10$$

The two latter equations should reach the same value for $R_w$, since they result from one single measurement (resistivities converted into salinities). Therefore, when SFE = SFE(R) = zero then $R_w \cong 0.065$ Ohm.m at 24° C.

CORRELATIONS

Figure 1:
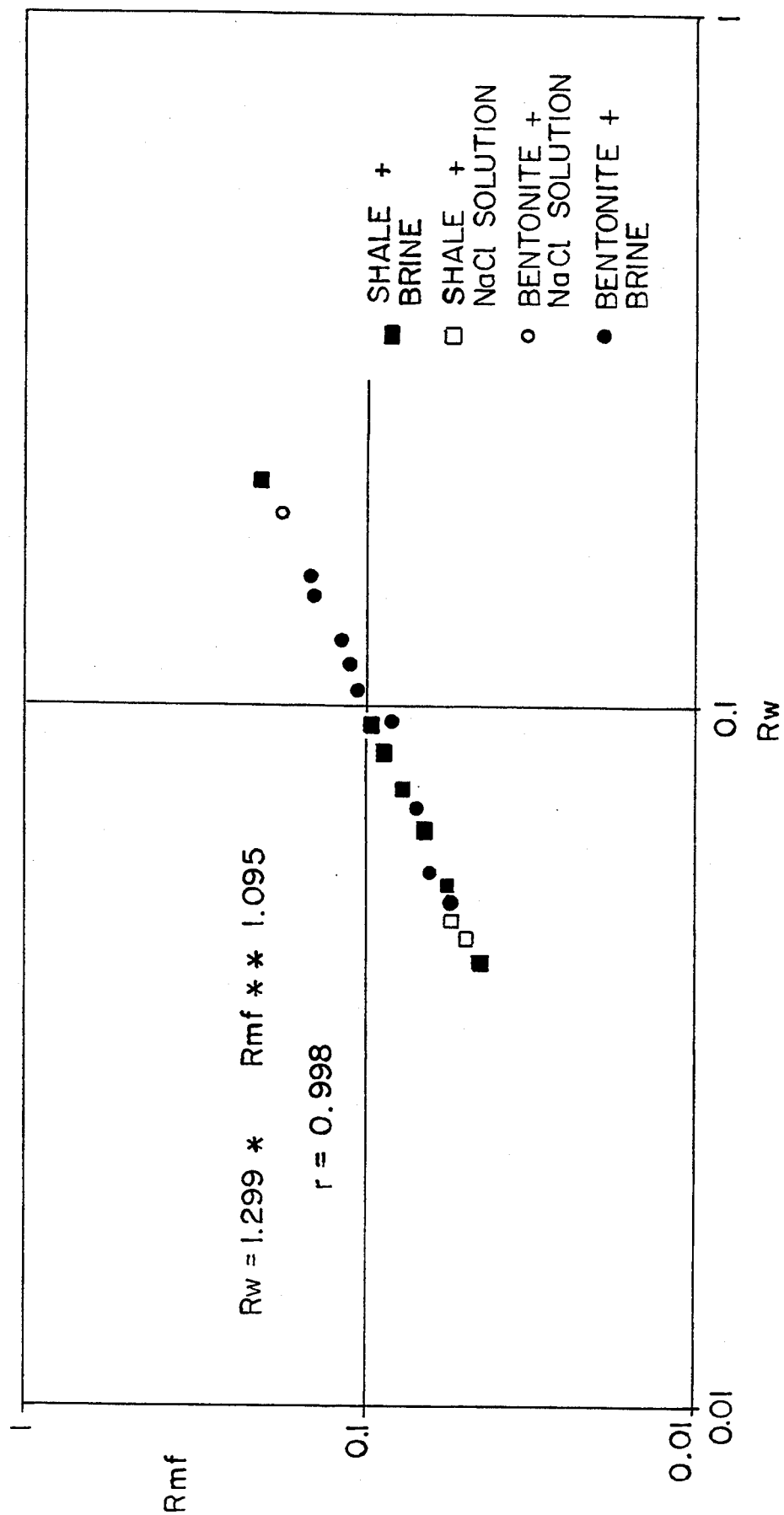
FIG. 1 is δ plot according to data from Table I, that is, $R_{mf}$ vs. $R_w$, resulting in an equation the correlation coefficient of which is 0.998.

FIG. 1 and Table I show that the muds employed in the present method, when submitted to low pressure (a favorable condition for the osmotic diffusion) can squeeze out or retain salts, according to their original water concentration. The higher the concentration of the original water (low $R_w$ value), the higher the efficiency of its clayminerals to filtrate or retain salts. That is, these muds effluents will be more diluted or sweeter ($R_{mf} > R_w$). The lower the original water concentration (high $R_w$ value), the higher the salt concentration in its effluents ($R_{mf} < R_w$) or either, the higher the squeezing out of salts by the mud clayminerals, or low filtration efficiency.

Resistivity readings were transformed into salinities relative to NaCl by means of the above-mentioned equation by R. M. Bateman and Konen:

$$SAL(BK) = 10[3.562 - \log(R_w - 0.0123)/0.955]$$

where $R_w$ is quoted in Ohm.m at 24° C. and SAL(BK) in ppm NaCl.

Besides, Table I shows two columns corresponding to the salt filtration efficiency for each mud sample. SFE was obtained from salinities determined in columns SAL(BK), while SFE(R) was calculated by means of the corresponding resistivity values.

The Salt Filtration Efficiency SFE is given by the equation set forth by I. Demir in "The Interrelation of Hydrodynamic and Electrical Conductivities, Streaming Potential and Salt filtration during the Flow of Chloride Brines through a Smectite Layer at Elevated Pressures", in Journal of Hydrology, vol. 98, p. 31-52 (1988):

$$SFE = [(MW - ME)/MW] \times 100$$

where SFE is the Salt Filtration Efficiency, M is the solution concentration in ppm, while W and E correspond respectively to the original water used in the preparation of the mud and its effluent.

Analogously, EFS(R) was determined by $$SFE(R) = (R_w - R_{mf}/R_w) \times 100$$

both resistivities being determined at 24° C.

As seen before, the results of overall atomic absorption for K, Mg, Na and Ca in the samples show, through the correlation coefficient 0.978, an excellent consistency between resistivities and relative salinities for these four elements.

However, the individual results of atomic absorption for the same elements, as in FIGS. 3 to 6, shows that, taken separately, the behavior of each element is quite different. In each of the FIGS. 3 to 6, points found below the bisector show a higher salinity of the filtrate than in the original mud water. This means that there has been retention, or high filtration efficiency, by the specific mud sample, this behavior being listed in Table II as a positive value. On their turn, points found above the bisector mean that the filtrates are of higher salinity than the original water, being negative on Table II. This indicates low filtration efficiency (squeezing out of salts).

Furthermore, FIGS. 3 to 6 illustrate visually that concentrations in K, Mg, Ns and Ca (in this order) are being reduced, this fact also being evident in Table II: 16, 3, −5 and −60. Table II also shows that only Calcium presents a significantly different numerical value between the SFE of bentonites and shales (−105 and −14, respectively while other elements showed a very similar filtration behavior.

Therefore, on the basis of Table II numbers, a retention scale can be established for the studied elements K>Mg>Na>Ca. This scale is coincident with that observed in interstitial waters recovered from the Sergi formation, underlying the Candeias formation. It could be hypothesized, on the basis of these arguments, that during the compaction of the Sergi sediments, the Candeias shale featured a semi-permeable, perfect, electrostatic membrane, with partial filtration of the salts which were directed to the surface, forced by the overburden.

The filtration efficiency of shaly muds can also be represented on the basis of the measurement of partial salinities using the atomic absorption of K, Mg, Na and Ca:

$$SFE(PDS) = [(MDPS - EPDS) / MPDS] \times 100$$

where PDS means Partial Dissolved Solids; M and E are respectively the original water and effluent. See Table II for the results.

In other words, the equations set forth herein represent the best approximations of the shaly muds osmotic balance actual conditions, under the experimental conditions established in the present invention. If no osmotic filtration exists due to the stabilization of the fluid displacement, then $R_w = R_{mf} = SFE = SFE(R)$ and the shale macropore interstitial waters will show the same salinity as the micropore waters. Their resistivity is the $R_{wb}$ parameter, which should be used in log interpretation models such as that of the Dual Water and the like.

While using the values as determined for the Candeias shales (116,500 ppm or 180,000 mg/l NACl) and the field estimated values for the interstitial waters of the same formation (180,000 ppm or 200,000 mg/l NaCl), there is obtained a 1:1.55 ratio (shale water:sandstone water) which is consistent with the Mexican Gulf Coast shale osmotic balance as determined by H. H. Hinch, in "the Nature of Shales and the Dynamics of Hydrocarbon Expulsion in the Gulf Coast Tertiary Section", AAPG Problems of Petroleum Migration, Studies in Geology 10. p. 1–18 (1980). This author found the value 1:2.

Therefore, clayminerals exhibit two distinct kinds of salt retention, or filtration. The first kind occurs at low pressures and is of an osmotic nature while the second one occurs only under high compressions where the overburden causes the expulsion of most of the fluids which exist in the pores. The distance between the granules is reduced, causing the overlapping of double electric layers of adjacent claymineral particles. This second kind of retention is purely electrostatic in nature. Before they reach high pressures, the lower limit of which is not yet well established, shaly muds interact osmotically, due to the vapor pressure differential established between their macro and micropore solutions.

In order that an osmotic flow be set between two electrolytic solutions, there should exist not only a numerical difference between both electrolytic concentrations; it is essential that their vapor pressures be significantly distinct. Although the solutions between a shaly mud macro and micropores could present the same salinity during the initial deposition stage, soon the water molecules adsorption on the micropores or counter ions surface will cause that the pressure in the micropores be lower than that in the macropores.

As soon as osmosis is established, the macroporous solutions alter their concentrations, so that any increase in overburden will expel a solution, the concentration of which is different from the initial one. The macroporous solutions are more easily displaced than the microporous ones, which, on their turn, will flow only under fairly high pressures, since they are kept in extremely fine tubes, of high capillary pressure.

Several log interpretation models use the concept of the double electric layer in the study of shaly rocks, one of them being the widely known method of Clavier, cited hereinbefore. According to this theory, there are two distinct types of water within the shaly rocks: one of them is absorbed on the clayminerals, the resistivity of which is called $R_{wb}$, and another one, free in the rock pore, is called $R_w$. The resulting volumetric balance of both waters produces the actual interstitial water of resistivity $R_{wm}$. For rocks free of shales, $R_{wm} = R_w$.

The amount of clay within a reservoir rock plays an important role in the evaluation of the overall water present in the rock reservoir. As the clay volume increases, or its Cation Exchange Capacity increases, the amount of adsorbed water also increases. Thus, 10% by weight smectite dispersed in a sandstone will adsorb more water molecules than the same amount of kaolinite.

Presently, advanced well log quantitative interpretations recognize that shale properties, the shales being situated downwards and overlying the layers under study, show the same mineralogical characteristics of the shales present within the pores of these layers. However, this hypothesis does not reflect a true situation since:

a) Nearby shales and/or clayminerals are not necessarily the same which are dispersed within the pores of a reservoir rock (chiefly if they belong to the autigenic kind);

b) Equally, the petrophysical parameters (a and m) are not necessarily the same for clayminerals and sandstones.

Therefore, mistakes in log interpretations can be minimized by effecting osmotic filtration experiments, as described and claimed in the present invent/on. Such filtrations would require a minimum additional operation cost, since in most of the areas of interest for hydrocarbons, normally a rather large number of cores is collected in order to submit the production layers to more accurate petrophysical studies.

The Examples set forth, based on artificial muds comprised of the Cande/as shale and commercially available bentonite, under incipient pressures of just 100 psig (7 kg,/cm$^2$) lead to the conclusion that the osmotic filtration efficiency (SFE) of these muds is:

I. Independent of their mineralogical content (since shale and bentonite have been used);

II. Independent of the Cation Exchange Capacity (CEC) of the claymineral (bentonite=97; Candeias Shale=44 meq/100 g of dry matter);

III. Independent of the original or interstitial water, used to prepare the mud (NaCl solution and brines prepared from concentrated seawater have been prepared, the range varying from 29,623 up to 255,995 ppm NaCl equivalents); and IV. Dependent on the dissolved salts concentration in the original, or interstitial water:

1. The (osmotic) filtration efficiency increases with the increase of the original, interstitial solution salt concentration, and 2. The (osmotic) filtration efficiency is reduced as is reduced the original, or interstitial, solution salt concentration.

Therefore, on the basis of the Examples set forth, it is hypothesized that the resistivity of the water adsorbed to the Candeias shale pores, for that area and at the investigated depth, is $R_{wb}$=0.065 Ohm.m at 24° C. (75° C.) or 116,500 ppm NACl.

CONTROL

For the sake of numerical comparison between the method of the present invention and a widely known method largely employed in the oil industry, that is, the LOGCALC software available at PETROBRÁS (the Brazilian oil State Company), the $R_{wb}$ parameter has been calculated through the conventional method:

$R_{wb} = \phi SH^m \cdot RSH / a$, where $\phi$ SH is the apparent porosity of the shales adjacent to the reservoir bodies, calculated in the logs for typical shaly zones; and RSH is the resistivity read for the corresponding shales. This method indicated $R_{wb}$=0.016 Ohm.m at 82° C. (or 0.036 Ohm.m at 24° C.). Such resistivity implies in a concentration higher than 300,000 equivalent NaCl ppm, that is, a solution which is saturated in NaCl under the reservoir conditions. However, under natural conditions, this is an impossible fact to occur, since the referred to concentration is much higher than the solubilization limit of sodium chloride, with corresponding precipitation.

Considering the results cited by Hinch, 1980, for the ratio shale interstitial water/sandstone interstitial water as being 1:2 (Mexican Gulf Shales) and taking as correct the same ratio as determined by the method herein disclosed as being 1:1.55 (Candeias shales, Aracás Field), it is realized that $R_{wb}$ determined by the LOG-CALC method would point out a much higher ratio than the other two (1:0.6), and therefore inconsistent with the theoretical lecture on the osmotic balance herein disclosed. Shale waters salinity should always be lower than that of adjacent sandstones.

It is recommended that laboratory methods be preferably employed to determine the $R_{wb}$ parameter, since figures directly issued from log data are influenced by apparent porosities, not consistent with reality. The method herein disclosed and claimed is independent of the reservoir porosity, being a function of the clayminerals mineralogical composition.

TABLE I

| EX No | RESISTIVITIES AND SALINITIES | | | | FILTRATION EFFICIENCY | | NOTE |
|---|---|---|---|---|---|---|---|
| | $R_w$ | SAL (BK) | $R_{mf}$ | SAL (BK) | EFS | EFS (R) | |
| 1 | 0,043 | 255,995 | 0,045 | 192,881 | 25 | −5 | SH + S |
| 2 | 0,047 | 181,256 | 0,049 | 170,926 | 6 | −4 | SH + A |
| 3 | 0,049 | 170,926 | 0,052 | 157,426 | 8 | −6 | SH + A |
| 4 | 0,052 | 157,426 | 0,054 | 149,529 | 5 | −4 | BEN + S |
| 5 | 0,054 | 149,529 | 0,053 | 153,378 | −3 | 2 | SH + S |
| 6 | 0,055 | 145,864 | 0,056 | 142,371 | 2 | −2 | SH + S |
| 7 | 0,058 | 135,853 | 0,062 | 124,427 | 8 | −7 | BEN + S |
| 8 | 0,066 | 114,739 | 0,065 | 117,020 | −2 | 2 | SH + S |
| 9 | 0,071 | 104,526 | 0,070 | 106,424 | −2 | 1 | BEN + S |
| 10 | 0,076 | 95,951 | 0,074 | 99,211 | −3 | 3 | SH + S |
| 11 | 0,079 | 91,437 | 0,073 | 100,923 | −10 | 8 | BEN + A |
| 12 | 0,079 | 91,437 | 0,074 | 99,211 | −9 | 6 | SH + A |
| 13 | 0,086 | 82,364 | 0,084 | 84,771 | −3 | 2 | SH + S |
| 14 | 0,093 | 74,899 | 0,091 | 76,893 | −3 | 2 | SH + S |
| 15 | 0,095 | 73,003 | 0,092 | 75,883 | −4 | 3 | BEN + S |
| 16 | 0,105 | 64,779 | 0,102 | 67,049 | −4 | 3 | BEN + S |
| 17 | 0,114 | 58,789 | 0,106 | 64,055 | −9 | 7 | BEN + S |
| 18 | 0,125 | 52,794 | 0,116 | 57,602 | −9 | 7 | BEN + S |
| 19 | 0,145 | 44,494 | 0,138 | 47,092 | −6 | 5 | BEN + S |
| 20 | 0,153 | 41,848 | 0,141 | 45,943 | −10 | 8 | BEN + S |
| 21 | 0,188 | 33,163 | 0,173 | 36,411 | −10 | 8 | BEN + A |
| 22 | 0,190 | 32,772 | 0,172 | 36,650 | −12 | 9 | SH + A |
| 23 | 0,208 | 29,623 | 0,192 | 32,390 | −9 | 8 | SH + S |

NOTES
SALINITIES IN ppm NaCl
RESISTIVITIES IN ohm.m at 24° C.
BEN = BENTONITE
SH = SHALE
A = NaCl SOLUTION
S = EVAPORATED SEAWATER

TABLE II

| SAMPLE | SODIUM | | | POTASSIUM | | | CALCIUM | | | MAGNESIUM | | |
|---|---|---|---|---|---|---|---|---|---|---|---|---|
| | Na$^+(\mu)$ | Na$^+$(E) | EFS | K$^+(\mu)$ | K$^+$(E) | EFS | Ca$^+(\mu)$ | Ca(E) | EFS | Mg$^+(\mu)$ | Mg$^+$(E) | EFS |
| 20 | 14,000 | 16,000 | −20 | 510 | 573 | −11 | 581 | 1,896 | −226 | 1,739 | 1,682 | 3 |
| 19 | 16,000 | 17,500 | −9 | 585 | 446 | 24 | 661 | 1,916 | −190 | 2,006 | 1,816 | 9 |
| 18 | 20,400 | 21,400 | −5 | 713 | 599 | 16 | 782 | 1,946 | −149 | 2,541 | 2,463 | 3 |
| 17 | 20,600 | 21,200 | −3 | 739 | 574 | 22 | 822 | 1,916 | −133 | 2,578 | 2,439 | 5 |
| 16 | 23,600 | 33,000 | −40 | 816 | 898 | −10 | 1,377 | 2,196 | −59 | 2,917 | 4,115 | −41 |
| 15 | 32,400 | 23,800 | 27 | 1,182 | 630 | 47 | 1,222 | 1,946 | −59 | 4,244 | 2,844 | 33 |
| 9 | 34,000 | 38,000 | −12 | 1,308 | 1,044 | 20 | 1,323 | 2,116 | −60 | 4,694 | 4,951 | −5 |
| 7 | 50,000 | 50,500 | −1 | 1,785 | 1,194 | 33 | 1,218 | 1,796 | −47 | 6,209 | 6,839 | −10 |
| 4 | 65,500 | 66,750 | −2 | 2,352 | 2,063 | 12 | 898 | 1,048 | −17 | 8,400 | 8,533 | −2 |

TABLE II-continued

| | | | | | | | | | | | | |
|---|---|---|---|---|---|---|---|---|---|---|---|---|
| 21 | | | | | | | | | | | | |
| 11 | | | | | | | | | | | | |
| 22 | 13,500 | 14,600 | −8 | | | | | | | | | |
| 12 | 39,200 | 40,800 | −4 | | | | | | | | | |
| 2 | 74,500 | 78,500 | −5 | | | | | | | | | |
| 3 | | | | | | | | | | | | |
| 23 | 12,082 | 13,414 | −11 | 391 | 307 | 21 | 434 | 428 | 1 | 1,398 | 1,028 | 26 |
| 14 | 29,976 | 30,460 | −2 | 1,019 | 822 | 19 | 962 | 1,056 | −10 | 3,585 | 3,257 | 9 |
| 13 | 32,324 | 33,535 | −4 | 1,136 | 825 | 27 | 1,091 | 1,243 | −14 | 3,947 | 3,577 | 9 |
| 10 | 40,194 | 42,918 | −7 | 1,358 | 1,434 | −6 | 1,267 | 1,255 | 1 | 4,852 | 4,975 | −3 |
| 8 | 49,274 | 51,392 | −4 | 1,651 | 1,458 | 12 | 1,220 | 1,255 | −3 | 5,921 | 5,309 | 10 |
| 6 | 70,702 | 64,649 | 9 | 278 | 207 | 26 | 2,020 | 2,507 | −24 | 1,208 | 1,120 | 7 |
| 5 | 70,702 | 73,123 | −3 | 2,353 | 2,086 | 11 | 886 | 962 | −9 | 8,141 | 8,141 | 0 |
| 1 | 114,189 | 113,220 | 1 | 446 | 380 | 15 | 390 | 616 | −58 | 446 | 471 | −6 |
| SFE (BEN) = | | | −7 | | | 17 | | | | | −105 | 0 |
| SFE (SH) = | | | −3 | | | 16 | | | | | −14 | 7 |
| EFS (BEN + SH) = | | | −5 | | | 16 | | | | | −60 | 3 |

| | | ATOMIC ABSORPTION | | | SALINITIES (B & K) | | | KIND OF |
|---|---|---|---|---|---|---|---|---|
| | SAMPLE | MPDS | EPDS | EFS (PDS) | WATER | EFFLUENT | SFE | MUD |
| | 20 | 16,838 | 20,951 | −24 | 41,848 | 45,943 | −10 | BEN + S |
| | 19 | 19,252 | 21,678 | −13 | 44,494 | 47,092 | −6 | BEN + S |
| | 18 | 24,436 | 26,408 | −8 | 52,794 | 57,602 | −9 | BEN + S |
| | 17 | 24,739 | 16,229 | −6 | 58,789 | 64,055 | 9 | BEN + S |
| | 16 | 20,710 | 40,209 | −40 | 64,779 | 67,049 | −4 | BEN + S |
| | 15 | 39,048 | 29,220 | 25 | 73,003 | 75,883 | −4 | BEN + S |
| | 9 | 41,325 | 46,111 | −12 | 104,526 | 106,424 | −2 | BEN + S |
| | 7 | 59,212 | 60,329 | −2 | 135,853 | 124,427 | 8 | BEN + S |
| | 4 | 77,150 | 78,394 | −2 | 157,426 | 149,529 | 5 | BEN + S |
| | 21 | | | | | | | BEN + A |
| | 11 | | | | | | | BEN + A |
| | 22 | | | | | | | FLM + A |
| | 12 | | | | | | | FLM + A |
| | 2 | | | | | | | FLM + A |
| | 3 | | | | | | | |
| | 23 | 14,305 | 15,177 | −6 | 29,623 | 32,390 | −9 | FLM + S |
| | 14 | 35,542 | 35,595 | 0 | 74,899 | 76,893 | 3 | FLM + s |
| | 13 | 38,498 | 39,180 | −2 | 82,364 | 84,771 | −3 | FLM + S |
| | 10 | 47,671 | 50,582 | −6 | 95,951 | 99,211 | −3 | FLM + S |
| | 8 | 58,066 | 59,414 | −2 | 114,739 | 117,020 | −2 | FLM + S |
| | 6 | 74,208 | 68,483 | 8 | 145,864 | 142,371 | 2 | FLM + S |
| | 5 | 82,082 | 84,312 | −3 | 149,529 | 153,378 | 3 | FLM + S |
| | 1 | 115,471 | 114,687 | | 255,995 | 192,881 | 25 | FLM + S |
| | SFE (BEN) = | | | −9 | | | −3 | |
| | SFE (SH) = | | | −7 | | | −2 | |
| | EFS (BEN + SH) = | | | −5 | | | −1 | |

I claim:

1. A method for determining the resistivity parameter $R_{wb}$ of waters adsorbed to a plurality of shale cores taken from an oil reservoir rock, which parameter is useful for estimating the reservoir rock hydrocarbon content, comprising the steps of:

(1) separately milling the shale of the respective shale cores to retain the fraction passing through a 200 mesh Tyler screen;

(2) preparing a plurality of brines varying in NaCl concentration from about 25,000 to about 250,000 ppm;

(3) measuring the resistivity $R_w$ of the plurality of brines as prepared in (2);

(4) separately preparing a plurality of muds having a solids content of about 20% and a liquids content of about 80% to provide a density of about 1.4 g/cm$^3$ from the milled shale cores of Step (1) and the brines of Step (2), and then allowing the muds thus prepared to settle for at least 72 hours;

(5) filtering each of the muds prepared in Step (4) at a pressure of about 7 kg/cm$^2$, collecting the respective filtrates and measuring the resistivities $R_{mf}$ thereof;

(6) plotting $R_w$ as a function of the salt filtration efficiency SFE(R), where SFE(R) is given by:

$$SFE(R) = \frac{R_w - R_{mf}}{R_w} \times 100$$

for each of the muds prepared in Step (4);

(7) extrapolating the data plotted in Step (6) to find the value of $R_w$ where SFE(R)=0; and (8) determining $R_{wb}$ as being equal to the value of $R_w$ where SFE(R) extrapolates to zero, at which value the resistivity of the brine used to prepare a mud is equal to the resistivity of the filtrate obtained from that mud or $R_{wb} = R_w = R_{mf}$.

2. The method of claim 1, wherein said brines are prepared from a NaCl solution.

* * * * *